United States Patent Office 2,990,285
Patented June 27, 1961

2,990,285
COMPOSITION CONTAINING SESAME SEEDS AND PROCESS FOR THE UTILIZATION THEREOF
Lyman O'Neal, deceased, late of Dallas, Tex., by Annie Catherine O'Neal, 6965 Junius St., Dallas, Tex.; Roy George O'Neal, 3722 Tamoshanter, Mesquite, Tex.; and Janet Catherine Johnson, 6965 Junius St., Dallas, Tex., heirs
No Drawing. Filed Dec. 5, 1958, Ser. No. 778,314
7 Claims. (Cl. 99—83)

This invention relates to a composition containing sesame seed and to a method for the preparation thereof. More particularly, it relates to the preparation of a deep-fat fried food product from sesame seed.

Sesame seed (*Sesamum indicum* L.) is a member of the oil seed family and the exact analysis of an unhulled sample of the K-10 variety is as follows:

| | Percent |
|---|---|
| Moisture | 4.70 |
| Protein | 23.85 |
| Oil | 53.10 |
| Fiber | 4.52 |
| Ash | 4.52 |
| Nitrogen free extract | 9.31 |
| Carbohydrates | 13.83 |

It is a high fat and a high protein seed which is very useful for nutritive purposes. The seed may be supplied in its natural form, partially dehulled and completely dehulled. It may be moisture free or the moisture content may be higher, for example, up to 8% at which seed can safely be stored. Wet seed from the dehulling operation or partial dehulling operation can be used directly in the mix containing up to 30% moisture content.

Sesame seed is widely available throughout the world and substantial quantities are grown in the United States, particularly in Texas. Dehulled sesame seed has been used by the baking industry for decorative and flavoring purposes and principally as a topping on rolls, bread and pastry. Natural seed is also used for similar purposes.

One of the objects of the present invention is to provide a new and improved method of producing a very tasty and highly nutritive, precooked food product containing sesame seed.

Another object of the invention is to provide a new and improved mix or blend of ingredients including sesame seed which can be readily extruded to form an extruded composition which will retain its physical shape in a hot frying liquid, and when fried in such a liquid results in a product having highly desirable characteristics including a crispy, crunchy consistency and a high percentage of the taste and nutrition components of the sesame seed contained therein.

A further object of the invention is to provide a new and improved process for preparing a deep-fat fried food product containing sesame seed. Other objects will appear hereinafter.

These objects are accomplished in accordance with the invention by first preparing a substantially dry mix containing the following ingredients:

| Ingredient: | Percent by weight |
|---|---|
| Sesame seed | 10–60 |
| Cracker flour | 10–60 |
| Cereal flour | 10–60 |
| Salt | 3–6 |
| Shortening | 0–5 |

In the foregoing composition the dehulled sesame seed is prepared by conventional methods wherein the hull is removed completely or partially, and the seed is washed and dried. For the purpose of the invention the seed can also be toasted prior to incorporating it into the mix. Natural seed when used should be clean and free of extraneous matter.

The cracker flour is a composition which is also sometimes referred to as "cracker meal" or "cracker crumbs" made by baking a cracker forming composition and grinding the resultant product. This is also a commercially available material. It is preferably made from wheat flour and can also be made from other cereal flours.

The cereal flour is one containing a substantial proportion of gluten and wheat flour is preferred. The amount of cereal flour used should be sufficient so that the gluten thereon enhances the cohesiveness of the product for extrusion. Water should be referred to as being used to form a dough necessary for extrusion.

In the following blends the cracker meal is made from soft winter wheat flour. The wheat flour used in the mixture is a blend of soft and hard winter wheat flours, known commercially as "family style flour."

Typical compositions which are suitable for the practice of the invention are the following:

Composition A

| Ingredients: | Percent by weight |
|---|---|
| Sesame seed | 40 |
| Cracker flour | 30 |
| Wheat flour | 25 |
| Salt (NaCl) | 5 |

Composition B

| Ingredients: | Percent by weight |
|---|---|
| Sesame seed | 30 |
| Cracker flour | 33 |
| Wheat flour | 33 |
| Salt (NaCl) | 4 |

Composition C

This composition is the same as Composition B except that 7% of the wheat flour is replaced by sesame flour.

Composition D

| | Percent by weight |
|---|---|
| Sesame seed | 40 |
| Cracker flour | 10 |
| Wheat flour | 40 |
| Salt (NaCl) | 5 |
| Shortening (butter or hydrogenated cotton seed oil or hydrogenated soy oil or hydrogenated sesame oil) | 5 |

It will be observed from the foregoing formulae that the sesame seed, cracker flour and cereal flour are used in approximately the same relative proportions except when shortening is used in the mixture. The ingredients are simply mixed together and the mixture is packaged for storage and future use or, if desired, it is converted into the final food product immediately. It will be understood that the foregoing compositions are directed toward the ingredients in their natural state, including the natural moisture content and the weight percentages given in each case therefor include the moisture contents which are subject to some variation.

To prepare the dough for extruding the following specific formula is used containing:

| | Percent |
|---|---|
| Sesame seed | 30 |
| Cracker flour | 33 |
| Flour | 33 |
| Salt (NaCl) | 4 |

With each 100 lbs. of this mixture add 53 lbs. of water together in a dough mixer of common usage in normal bakery operation, using an upright mixer or horizontal self dumping mixer. Blend until the moisture is incorporated into the dough, usually 2–3 minutes is all that is necessary. Remove the dough and put into an extruder in which utilizes hydraulic pressure against a ram within a tube or barrel to push the dough through dies that form the pieces in a predetermined shape.

To push the dough through these slots, pressure of approximately 1,000 lbs. per square inch is exerted on the hydraulic ram. The thickness of the slot in this specific instance is 40/1000 inch, 5/8 inch long and when extruded the pieces of dough can be cut to any length desired, usually 1"–1½" in length.

The extruded pieces of dough drop directly into hot fat which can be any commercially available vegetable oil or fat, such as cotton seed oil or similar vegetable oils, or commercially hydrogenated fats can be used.

In the above specific operation the dough is dropped into hot coconut oil, kept constantly at 365° F. and conveyed through the cooking vessel, submerging the pieces after the outside has been seared to prevent sticking. The total time of exposure to the hot oil is approximately 1½ minutes.

It is removed and cooled for packaging. There can be a light sprinkling of salt applied just after removal from the hot oil. This can be done in batch or continuously.

The temperature of hot oil used in cooking the product can very but will usually be around 350° F. to 400° F. It should be high enough for browning but low enough to avoid burning of the product or decomposition of the oil used.

The resultant food product has a very desirable crispy, crunchy consistency and a golden brown color. It is highly nutritious and contains a very high percentage of protein. While the incorporation of shortening with the dry mix is optional, this represents a preferred embodiment of the invention because the shortening tends to resist the absorption of the frying liquid. However, a product of excellent palatability is obtained without the shortening. The composition of the final product will naturally vary, depending to some extent upon the absorption of oil from the frying liquid. The percent water used in the dough can vary from 20–60%.

The shape is not restricted to a chip, but may be extruded in a stick form or other shapes determined by the die.

The term "cereal flour" as used herein refers to the flours of cereal grains, such as wheat, oats, rice, corn, rye, and barley. The term also includes modified forms of these flours. Thus, a modified corn flour which can be used is a lime treated product known as "Mesa Harina." This is a commonly known product in Latin American countries from which tortillas or their "bread" is made.

The present application is a continuation-in-part of copending application Serial No. 723,657, filed March 25, 1958, now abandoned, and copending application Serial No. 739,689, filed June 4, 1958, now abandoned.

The invention is hereby claimed as follows:

1. A composition adapted for making a fried sesame food product comprising sesame seed in a weight percent within the range of 10% to 60%, cracker flour a weight percent within the range of 10% to 60%, cereal flour in a weight percent within the range of 10% to 60% and shortening in a weight percent within the range from 0% to about 5%.

2. A composition adapted for making a fried sesame food product comprising sesame seed in a weight percent within the range of 10% to 60%, cracker flour in a weight percent within the range of 10% to 60%, wheat flour in a weight percent within the range of 10% to 60% and shortening in a weight percent within the range from 0% to about 5%.

3. A composition adapted for making a fried sesame food product comprising sesame seed in a weight percent within the range of 10% to 60%, cracker flour in a weight percent within the range of 10% to 60%, wheat flour in a weight percent within the range of 10% to 60%, shortening in a weight percent within the range from 0% to about 5%, and salt in a weight percent within the range from 3% to 6%.

4. A composition adapted for making a fried sesame food product which comprises an intimate mixture of approximately equal parts by weight of sesame seed, cracker flour and wheat flour, together with about 3% to 6% by weight of salt and 0% to about 5% by weight of shortening.

5. A method of preparing a crispy food product which comprises intimately mixing sesame seed in a weight percent within the range of 10% to 60%, cracker flour in a weight percent within the range of 10% to 60%, cereal flour in a weight percent within the range of 10% to 60% and shortening in a weight percent within the range from 0% to about 5%, with sufficient water to form a dough, shaping the mixture to a predetermined shape, and frying the shaped product.

6. A method of preparing a crispy food product having a crunchy consistency which comprises intimately blending a mixture consisting essentially of sesame seed in a weight percent within the range of 10% to 60%, cracker flour in a weight percent within the range of 10% to 60%, cereal flour in a weight percent within the range of 10% to 60% and shortening in a weight percent within the range from 0% to about 5%, with sufficient water to form a dough, shaping the resultant composition to a predetermined physical shape, frying the shaped product in a hot cooking oil, and removing the shaped fried product from the hot oil after it has reached a thoroughly fried crispy consistency.

7. A method of preparing a crispy food product having a crunchy consistency which comprises intimately blending a mixture consisting essentially of sesame seed in a weight percent within the range of 10% to 60%, cracker flour in a weight percent within the range of 10% to 60%, wheat flour in a weight percent within the range 10% to 60% and shortening in a weight percent within the range from 0% to about 5%, with sufficient water to form a dough suitable for extruding, extruding the resultant composition to a predetermined physical shape, frying the extruded product in a hot cooking oil, and removing the fried product from the hot oil after it has reached a thoroughly fried crispy consistency.

References Cited in the file of this patent

UNITED STATES PATENTS

| | | |
|---|---|---|
| 1,470,929 | Yu Chen Lai | Oct. 16, 1923 |
| 1,926,347 | Marrow | Sept. 12, 1933 |
| 2,002,053 | Doolin | May 21, 1935 |
| 2,168,246 | Shepherd | Aug. 1, 1939 |

OTHER REFERENCES

"Rice Curls," by Roberts et al., AIC–258, February 1950, U.S.D.A., Agricultural Research Administration, Bureau of Agricultural and Industrial Chemistry, Washington, D.C., pages 2–5.